United States Patent [19]

Sieggen

[11] Patent Number: 5,008,932
[45] Date of Patent: Apr. 16, 1991

[54] ADJUSTABLE PHONE HANDSET SHOULDER SUPPORT

[76] Inventor: Earl M. Sieggen, 2000 W. 120th Ter., Leawood, Kans. 66209

[21] Appl. No.: 305,743

[22] Filed: Feb. 3, 1989

[51] Int. Cl.⁵ .............................................. H04M 1/00
[52] U.S. Cl. .................................. 379/449; 379/447; 379/450; 379/455
[58] Field of Search ............... 379/449, 446, 447, 450, 379/454, 455, 430

[56] References Cited

U.S. PATENT DOCUMENTS

| | | | |
|---|---|---|---|
| 2,348,138 | 5/1944 | Latus et al. | 379/455 |
| 2,575,306 | 11/1951 | Van Dyke | 379/449 |
| 2,640,111 | 5/1953 | Samsky et al. | 379/449 |
| 2,804,510 | 8/1957 | Sanford | 379/449 |
| 2,863,954 | 12/1958 | Renneker | 379/449 |
| 3,025,360 | 3/1962 | Van Dyke | 379/449 |
| 3,830,987 | 8/1974 | Van Dyke | 379/449 |
| 4,058,689 | 11/1977 | Stebinger | 379/449 |
| 4,241,242 | 12/1980 | Yeh et al. | 379/449 |

FOREIGN PATENT DOCUMENTS

1141899  2/1969  United Kingdom ................ 379/449

Primary Examiner—Jin F. Ng
Assistant Examiner—Jason Chan
Attorney, Agent, or Firm—Thomas M. Scofield

[57] ABSTRACT

Improvement in telephone handset supports or, more specifically, shoulder supports for telephone handsets; such a support versatilely adjustable for users of different physical conformations, particularly with respect to the configuration of the user's head and shoulders; a device readily, simply and dependably changeable by the user to permit either left or right shoulder use, the versatility of adjustment with respect to size and configuration of the user's head and shoulders remaining the same with respect to each shoulder; a new, different and versatile connecting piece adjustably connecting and fixable with respect to the telephone handset on one end and a shoulder pad for the user on the other.

7 Claims, 2 Drawing Sheets

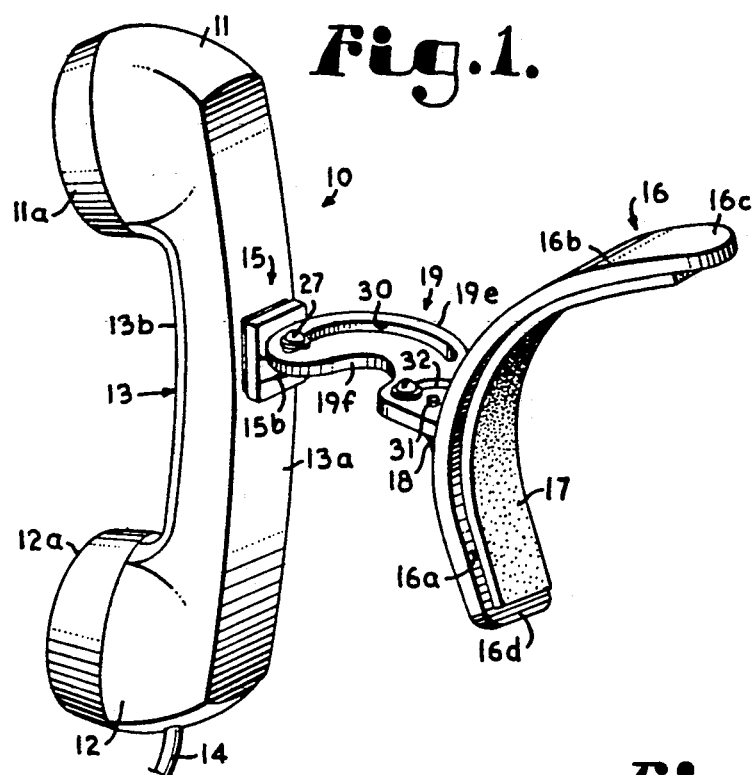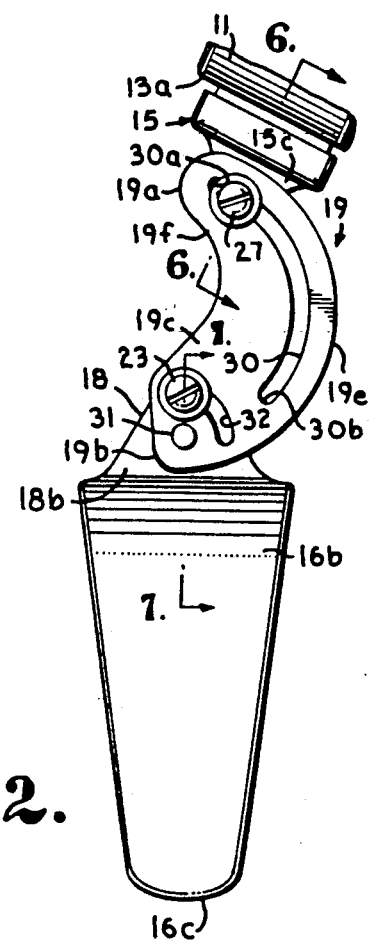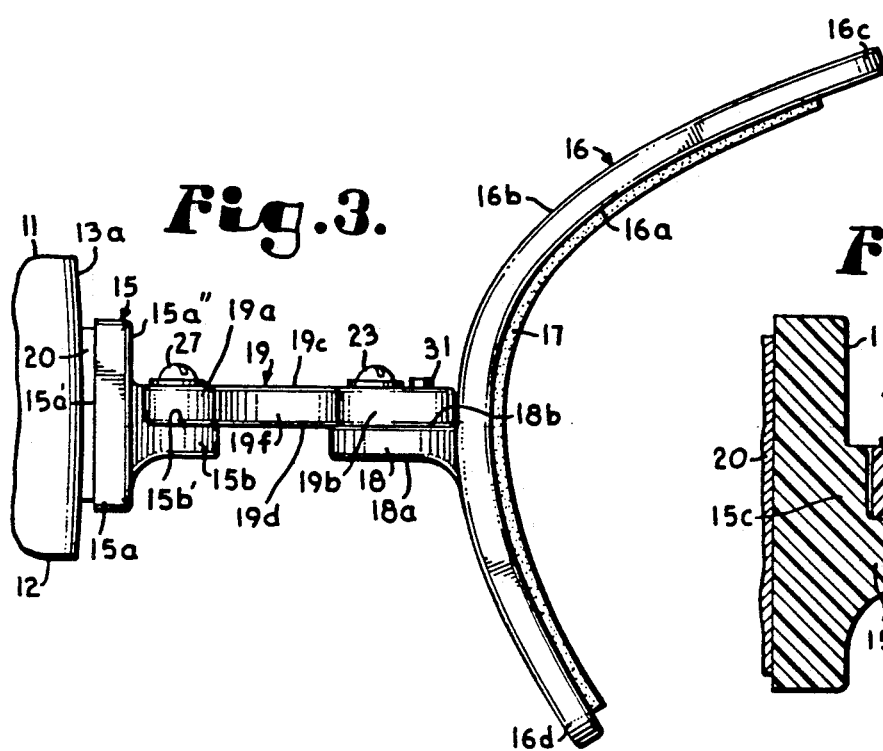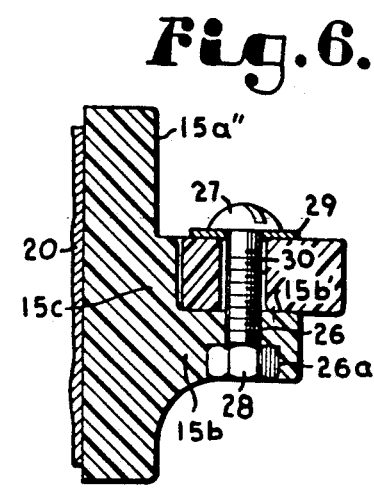

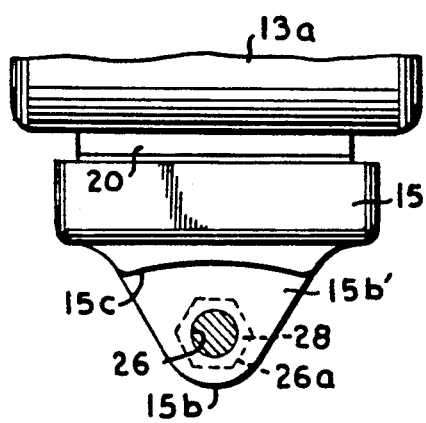
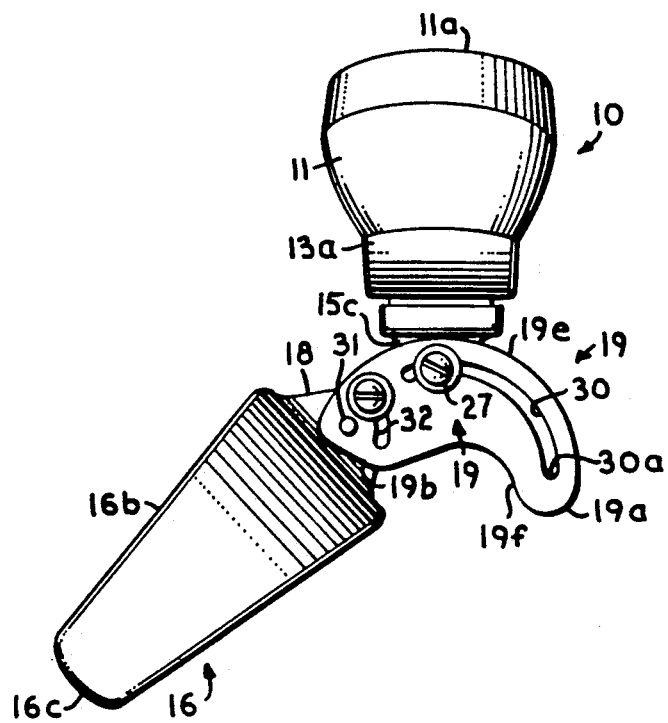
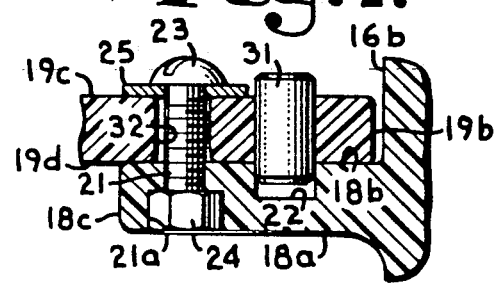
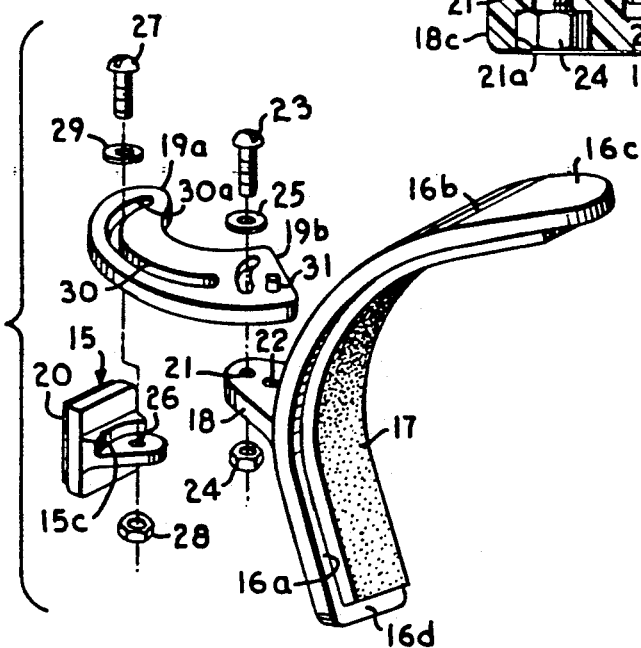

5,008,932

ADJUSTABLE PHONE HANDSET SHOULDER SUPPORT

BACKGROUND OF THE INVENTION

Numerous previously developed and commercial telephone handset support devices, for use on a phone user's shoulder, work and operate to enable the user to both listen and speak over a unitary receiver/transmitter telephone handset without holding the handset in his hands. Such telephone handset support devices have also previously been provided which may be used, alternatively, on either the left or right shoulder of the user person. Particular problems of such known devices have involved the necessity for considerable adjustment of the parts of the device with respect to the particular size and configuration of a user's head and shoulders, with such set of adjustments available with respect to either left or right shoulder-use. Shoulder-use typically varies with respect to the handedness of the user.

Improvements and developments have been made in the known devices, but such yet are not fully satisfactory and effective. Such available handset supports for telephone units are of a structure which typically include means for connection of the support structure to the grasping hand portion of an integral telephone receiver/transmitter member, as well as a suitable cradle or frame adapted to rest upon a selected one of the telephone user's shoulders (alternatively, upon readjustment, upon the other shoulder). Such devices must comfortably support the telephone handset or instrument in a continuous, easy, proper and optimum position in relation to the user's ear and mouth. Problems have been encountered with respect to simplifying and optimizing structure and function of the adjusting means and mechanisms for the relative positioning of the support device parts. More particularly, providing means and mechanisms for swiftly and easily affecting the precise adjustments required for conditioning and preparing the support device for being comfortably rested upon the user's left or right shoulder, according to the preference and optimum utility and comfort of the individual user, are necessary. Once set in a particular position for a particular user, the device must solidly retain its set configuration without variation or change.

From a survey of the devices available to the public on the market, improvements in shoulder support means for a telephone handset of the dual purpose type (having a handle means with a transmitter at one end and a receiver at the opposite end) are badly needed. What is desired is to provide such a handset shoulder support having a new, highly useful, novel arrangement of co-operating parts of minimum number and of the simplest configuration which, in use, combine to provide a new structural support device and adaptation thereof that most aptly fulfills the precise requirements and needs of a busy phone user.

As noted, many and varied forms of prior art handset holders have been devised and used by others. Such have met with varying degrees of success, although there seems to be no single prior device or holder of the character described which has met with widespread adoption and use, providing all the features needed at a reasonable price.

It thus becomes very desirable to structurally, functionally and otherwise improve upon similarly functioning or performing prior art phone handset holders, by virtue of developing a new structure and device embodying great simplicity but incorporating highly adaptable and adjustable refinements and improvements, which more aptly conform to and with the truly basic and important requirements and needs of manufacturers and users alike.

The optimum device of this sort must, in addition to offering left and right shoulder-use options, be fully and continuously adjustable for both angle and length. Optionally, such a device would easily and effectively fit on and engage any telephone receiver/transmitter handset that has approximately one square inch of free surface on the handle between the opposite ended transmitter and receiver thereof.

OBJECTS OF THE INVENTION

A first object of the invention is to provide a reversible and finely and precisely adjustable telephone shoulder rest which not only may be used on either the left or right shoulder of a user, but which is further continuously adjustable for both angle and length and may fit or be connected to any conventional telephone handset that has at least approximately one square inch of free surface on the back of the hand grip portion thereof.

Another object of the invention is to provide a telephone handset support for use on either shoulder of a user, which device, of itself, holds a phone handset firmly in any required and/or desired position and in which adjustments for physical variance in the user may be quickly and easily made, with the use position adjustment of the handset to one shoulder or another also readily and simply made.

Yet another object of the invention is provide a telephone handset support which is engineered for a maximum variety of body types and configurations, as well as maximum comfort and utility in use. The subject device is particularly designed for individuals who need or require the convenience of a handset support and who must be able to freely and comfortably work with both hands while using the telephone, with a minimum of difficulty, distraction and discomfort.

Another object of the invention is to provide an improved support construction for a telephone handset having a linking member for attaching a shoulder rest to the phone handset in such manner that the support can not only be readily converted for resting on either shoulder and used with either ear, but also is continuously and precisely adjustable for both angle and length in either shoulder arrangement.

Another object of the subject invention is to provide a novel, exceedingly simple, inexpensive yet versatile and durable telephone handset support, which can not only be manually adjusted in a very simple manner for use on either shoulder of the user, but is also easily and effectively configured in either shoulder setting so as to fit any particular physical, head, shoulder and neck type, size and pattern of the entire range of human types, male and female.

Yet another object of the invention is to provide an improved device of the character in question wherein the parts thereof may be easily and quickly assembled relative to one another (and to a telephone handset) with a minimum susceptibility to error on the part of the user and with a minimum chance of his/her misplacing, dropping and perhaps losing individual parts as an incident to initially fitting and thereafter adjusting and/or relatively repositioning the parts of the telephone handset support assembly.

Still another object of the invention is to so construct a holder for telephone handsets whereby such can be affixed to any standard instrument in right or left shoulder positions without the use of special tools and without the need of any special mechanical skill or highly detailed instructions. The holder is also easily molded of plastic materials and so constructed so that it will in no way damage or injure the telephone handset instrument or detract from the use thereof or yet, in any way, impair its finish.

Another object of this invention is to provide a device of the character described where the presence of the support connected to the phone handset has minimal effect on and impedance to hand holding the handset.

It is yet another object of the invention to structurally, functionally, and otherwise improve upon like purposed prior art phone handset holders by virtue of providing a new simple yet artfully crafted structure which is characterized by providing simple, swift, effective and highly adjustable and adaptable features and refinements thereof, and improvements which most aptly conform to the manufacturing and use requirement needs of manufacturers and users alike.

Still another object of the invention is to provide a device of the character described which is: (1) adjustable for the relative angle between the user's ear and shoulder, (2) additionally adjustable for length between the user's ear and shoulder, (3) fits any telephone handset having approximately one square inch of mounting surface between the earpiece and the mouthpiece; and (4) can be assembled readily, simply, and quickly to fit either the user's left or right shoulders and readily changed from one such setting to the other. Further, each of the angle and length adjustments involve continuous adjustability rather than discreet, fixed units thereof.

Other invention objects include means provided for continuous adjustment for length between shoulder and ear as well as continuous adjustment for both fore and aft angle between such. The device is of such simplicity and configuration of parts that it, disassembled, may be made flat for packaging.

Other objects of the invention will appear in the course of the following description.

THE PRIOR ART

Applicant is aware of the following United States prior art patents directed to various shoulder carried holders, supports and mountings for telephone handsets wherein the basic support or mounting for the handset is positioned on or engaged with one of the user's shoulders. There are other means typically associated therewith which hold a conventional phone transmitter/receiver handset in position for listening and talking by the user while freeing up both hands of the user for independent work.

Van Dyke U.S. Pat. No. 2,575,306 "Holder For Telephone Instruments" issued Nov. 13, 1951.

Samsky et al U.S. Pat. No. 2,640,111 "Shoulder Support For Telephone Handsets", issued May 26, 1953.

Renneker U.S. Pat. No. 2,863,954 issued Dec. 9, 1958 for "Telephone Handset Supports".

Van Dyke U.S. Pat. No. 3,025,360 "Telephone Handset Support" issued Mar. 13, 1962;

Van Dyke U.S. Pat. No. 3,830,987 issued Aug. 20, 1974 for "Two Position Telephone Handset Support";

Stebinger U.S. Pat. No. 4,058,689, issued Nov. 17, 1977 for "Variably Adjusted . . . Handset Support"; and Yeh, et al U.S. Pat. No. 4,241,242 issued Dec. 23, 1980 for "Telephone Handset Holder".

THE DRAWINGS

In the drawings, which form a part of the instant specification and are to be read in conjunction therewith, embodiments of the invention are shown and, in the various views, like numerals are employed to indicate like parts.

FIG. 1 is a three-quarter perspective view from above (and the rear with respect to the conventional telephone handset) showing the subject inventive device fixed to a conventional telephone handset in the manner of use on the left shoulder of the user.

FIG. 2 is a fragmentary, top plan view of the device of FIG. 1.

FIG. 3 is a view of the devices of FIGS. 1 and 2 taken from the left hand side of FIG. 2 looking toward the right in that view.

FIG. 4 is a fragmentary view taken from above the particular attachment of the device in question (which is fixed to the backside of the telephone handset between the transmitter and receiver portions thereof) to the hand grip portion of the handset. This view details the portion of FIG. 2 encompassed within the length of the line 6—6 thereof with the linking member being detached therefrom. This also shows the member seen in the exploded view of FIG. 8 in the lower left corner of that view, this figure taken from directly above that element looking down.

FIG. 5 shows the mounting of the shoulder arcuate member in a manner opposite from that seen in FIGS. 1-4, inclusive, specifically, for use on the user's right shoulder instead of left shoulder.

FIG. 6 is a view taken along the lines 6—6 of FIG. 2 in the direction of the arrows.

FIG. 7 is a view taken along the line 7—7 of FIG. 2 in the direction of the arrows.

FIG. 8 is an exploded view of the parts of the subject device taken from the right shoulder view of FIG. 5.

STRUCTURE AND FUNCTION

Referring to the drawings, therein is shown one type of entirely conventional telephone handset. This illustrated handset is not to be limiting. The subject invention can be used with an entirely flat telephone handset or, indeed, any handset or part thereof that has a surface of approximately one square inch available on the side of the handset away from the speaking and listening microphones.

In order to provide orientation in the various views, the handset, here generally designated 10, includes an earpiece member 11, a mouthpiece member 12 and a handgrip member therebetween generally designated 13. The speaking and listening sides of the mouthpiece member and earpiece member are designated 12a and 11a, respectively. The back or opposite side of such members are, in the example shown, co-extensive with the outer wall 13a of the handgrip member 13. The inner side of the handgrip is seen at 13b. A transmission cord may be seen at 14 in FIG. 1.

The subject device is basically made up of three parts. One of these parts is generally designated 15 and comprises a first flange member which is removably mountable on the outer side 13a of the telephone handset handgrip member intermediate the ear and mouthpiece members 11 and 12 thereof. The second part, generally designated 16, is an arcuate shoulder rest member, typically of substantially rectangular form, having an inner, concave, shoulder engagement side 16a and an outer, convex side 16b. The upper or shoulder overlying end of shoulder rest member 16 is designated 16c. The lower or frontal chest engaging portion of the said shoulder rest member is designated 16d. Optionally, but preferably, there is provided a frictional engaging pad or pads 17 fixed to the inner concave side 16a of the shoulder rest member, such pad(s) serving both as a frictional engagement to aid in holding the shoulder rest member stationary on a user's shoulder and, additionally, serve as padding therefor.

The outer side 16b has second flange member generally designated 18 thereon intermediate the end 16c and 16d of shoulder rest member 16, optimally placed closer to end 16d. Flange 18 extends substantially normal to the portion of outer face 16b of member 16 where it is attached or formed.

Generally designated 19 is an elongate, arcuate, flat connecting member or piece which is adjustably and removably connected to each of said first flange member 15 and second flange member 18 at opposite ends 19a and 19b thereof, respectively. Turning back to first flange member 15, this member has a preferably square or rectangular (optionally oval or circular) base member 15a preferably flat on the inner and outer sides 15a' and 15a" thereof, respectively. On the inner wall or face 15a', there is provided means to sealingly engage base 15 to face 13a of handgrip portion 13a of the telephone handset. Such means 20 optionally comprises a flat piece of doubly adhesive faced material which is strongly adhered on one side to face 15a' of base 15 and, on the opposite face thereof next to surface 13a is also so adhesively faced. Such latter face preferably has the adhesive layer thereof removably covered until the base 15 is ready to be applied to surface 13a.

Integral with or attached to the outer panel or face 15a" of base 15 is flange 15b whose outward upper portion 15c is arcuately configured in its inward facing face thereof (toward member 19) so as to engage and guide one longer side of member 19 as it is adjusted, at one end and lengthwise portions thereof, with respect to flange 15b. Between "vertical" (in the views of FIGS. 1, 3 and 6) arcuate portion 15c and flange 15b lies platform 15b', the "upper" face of flange 15b which receives thereon end 19a or other "underside" portions 19d of member 19 thereon to be described. Member 19 also has flat "upper" face 19c, the latter opposed to "lower" face 19d. It should be noted that member 19 is optimally of a thickness (FIGS. 3, 6 and 8) substantially equal to the height of inboard portion 15c.

Flange 18 on member 16 has "lower" surface 18a and "upper" surface 18b. Referring to FIG. 7, as well as the lower right hand center portion of FIG. 8, flange 18 has bolt passage 21, 21a therethrough adjacent the inboard end thereof at 18c and, as well, cylindrical recess 22 therewithin outboard of bolt opening 21, 21a. As particularly visible in FIG. 7, upper passage portion 21 is for the threaded shaft of a bolt 23, while lower opening or passage portion 21a is hexagonal whereby to receive, fixedly therewithin, nut 24. Lock washer 25 is preferably employed with the bolt assembly.

Referring to FIG. 6, it may be seen that flange 15b has passage 26, 26a "vertically" therethrough whereby to receive the threaded shaft of a bolt 27 rotatably therethrough and nut 28 fixedly within hexagonal passage portion 26a. Lock washer 29 is preferably employed with the bolt assembly.

Returning to member 19, therein and therethrough is formed elongate, arcuate slot 30 which has one end 30a adjacent end 19a of connector 19, the other end 30b thereof extending beyond the arcuate mid point of member 19, preferably, but not closely approaching end 19b. Member 19 also has convex, arcuate outer edge 19e and arcuate, inner, concave edge 19f. The curvature of edge 19e is preferably uniform, with the curvature of slot 30 matching that of edge 19e and inwardly spaced approximately the same distance from edge 19e along the length of said slot 30.

Looking at member 19 adjacent end 19b thereof, there is first provided a post 31 fairly closely adjacent end 19b and edge 19e, which post extends upwardly and downwardly (normal to) faces 19c and 19d of member 19. Particularly note FIG. 7, wherein a first end of post 31 is received in cylindrical passage or opening 22, the opposite end of post 31 extending upwardly from face 19c an equal distance for engagement with the same opening 22 when member 19 is inverted, as will be described.

Inboard on member 19 (toward end 30b of slot 30 in the body of member 19) is positioned slot 32 which runs on a center from the center of post 31 in a circumferential, circular arc thereof. The shaft of bolt 23 passes through slot 32, thereby pinning the end 19b of member 19 in a fixed position with respect to rotation around post 31 when bolt 23 is tightened down into nut 24.

On loosening of bolt 27 with respect to nut 28 (FIG. 6), lengthwise adjustment of member 19 via slot 30 with respect to bolt shaft 27 is possible.

OPERATION

In operation of the disclosed apparatus assemblage with the shoulder rest member 16 to be positioned on the left shoulder of the user, the arrangement is as seen in in FIGS. 1, 2, 3, 4, 6 and 7. On the other hand, FIGS. 5 and 8 show the assembly members (together in FIG. 5 and exploded in FIG. 8) oriented so as to prepare the telephone handset for use with the shoulder rest member 16 on the user's right shoulder. The former arrangement will be first described.

Looking, then, at the figures other than FIGS. 5 and 8, base member 15 is fixed along surface 13a of handgrip portion 13 of telephone handset 10 at a position determined by the user between earpiece 11a and mouthpiece 12a by exposing the outboard adhesive surface of pad 20. Normally, this position will be between the half-way point from 11 to 12 to a point approximately 1 inch for the half-way point toward 11. It is assumed that shoulder rest member 16 has member 19 affixed to base 18b of flange 18 by virtue of the post 31 engagement in cylindrical opening 22 (FIG. 7) and bolt 23 engaged with nut 24 through slot 32 and passage 21, 21a. With respect to the shoulder rest member end portions 16c and 16d, flange 18 is fixed to or integral with member 16. Once base 15 and flange 15b are fixed on the handgrip portion 13 of the handset, connector 19 is engaged through slot 30 therein (FIG. 6) by bolt 27. Length adjustments are primarily made through varying the position of engagement of bolt 27 with slot 30 along the length of the latter, while angular positions are largely controlled by the engagement of bolt 23 through slot 32 into flange 18.

In order to shift to the opposite shoulder use, specifically, from the use with shoulder rest 16 on the left shoulder of the user to the shoulder rest 16 on the right shoulder of the user, only one change is necessary. That is, comparing FIGS. 5 and 8 with the other figures, member 19 is simply flipped over so that, in the view of FIG. 1, for a left handed person, the concave edge 19e of member 19 would be close to the observer as opposed to being away therefrom in the view of FIG. 1 and the opposite with respect to the concave edge 19f. The pivotal engagement of end 19b of member 19 is by the opposite end of post 31 in FIG. 7 extending into cylindrical opening 22. Naturally, in changing from one position of member 19 to the opposite, bolts 23 and 27 are removed and then replaced in their respective passages once 19 is flipped over. Once the optimum position of the respective bolts 23 and 27 in the respective slots 32 and 30 are obtained, the bolts are tightened down upon the lock washers 29 and 25 via the bolts engaged therewith whereby to fix the angular and lengthwise position of member 19 with respect to the shoulder rest and the handgrip of the phone handset.

Thus it may be seen that the device, as disclosed, has full reversibility between sides, with full adjustability for each side and/or handedness use. No clamps or screws are required to engage base 15 to handgrip 13 of the phone handset. Adjustment for length between the user's shoulder and ear is accomplished largely by means of the curved long slot 30. Adjustment for both fore and aft angles is accomplished primarily with respect to slot 32.

Scale

Merely to give a good example of scale in one specific embodiment of the invention, and not to be limiting, the following typical, useable dimensions may be employed. Thus, before curvature, the length of shoulder rest 16 may be about 6⅞ths inches. From end 16d to the "upperside" 18a of flange 18 may be 4 9/16ths of an inch, with the thickness of flange 18 approximating 3/16ths of an inch. The length of flange 18 may be close to one inch. The greatest width of rest 16 may be approximately 1½ inches and its thickness approximately 5/32nds of an inch.

With respect to member 19, the center of slot 32 may be swung on a 0.31 inch radius from the center of post 31. Parallel lines grazing end 19b and through the center of post 31 may be 0.25 inches apart. From a center taken 0.88 inches from the center of post 31 from one of said parallel lines, the radius of slot 30 may be 0.88 inches and the radius of arcuate side 19e 1.12 inches. The arcuate end 19a, from the center of the arcuate slot end 30a may be ¼ inches. The radius from the previously noted center to the arcuate center line of slot 30 remains 0.88 inches, with the radius of the edge 19e being 1.12 inches for the substantial length of slot 30, at least.

In assembling the device, either for left or right hand use, the user preferably turns the screw heads towards the earpiece end of the phone and the nuts on the screws or bolts toward the mouthpiece end. In changing from right hand to left hand useage, the headphone piece base stays where it is initially placed without change. This is also true in the opposite side change. Thus, all one does in the change is to turn over the connecting member 19 with respect to the two pieces as seen in FIGS. 1, 2, 3 and 5. A spare shoulder piece may be provided for the transition between right shoulder and left shoulder use.

It is important to have the curves match closely on the handset base and the connecting piece 19 longer convex side 19e. In applying the device, one optimally starts at the shoulder rest end, locking same in the best fitting position (determined by actual manipulation and testing) locking the shoulder rest end by means of the pivot pin 31 and bolt 23 and nut 24 in slot 32. Then, typically, at the head set end, the optimum position will be determined and then locked by bolt 27 and nut 28 in longer slot 30. Thus there are provided two adjustment slots with a pivotal mounting on the shoulder piece 16. Coupled with that pivotal outer base attachment, there are the two bolts 23 and 27 engaging, as seen in FIGS. 6 and 7, particularly, the two slots on intermediate piece 19.

In change of shoulders mounting, the nuts preferably remain toward the mouthpiece and the screwheads remain towards the earpiece. The cutaway side of the headset flange stays or is fixed toward the earpiece end. By replacing the attachment pad on another handset, the shoulder member 16 and intermediate member 19 can be transferred from one handset to another.

What has been provided, as has been shown and described, is a handset/shoulder mounting assembly which is adjustable for the precise angle between the users ear and shoulder. Further, such is adjustable for length between the ear and shoulder. This device can be attached to and fits any telephone handset having approximately one square inch of mounting surface between the earpiece and the mouthpiece. It can be assembled to fit either left or right shoulder and readily and simply, as well as swiftly be changed from one side to the other.

In use, the short slot 32 is strictly for angle adjustment. The longer slot 19 has a primary function for length adjustment and a secondary function with respect to angle adjustment. The double end extension of pin 31 with respect to recess 22 (FIG. 7) enables the change from side to side (left to right and vice versa) by simply flipping over the center member 19.

This device is variably and finely adjustable in very small increments both with respect to slot 32 and slot 30. One may provide a shoulder member 16 without end tapers as seen in these figures or any particular desired shape which will mount the flange 18 with opening 21 and recess 22, the former to receive bolt 24, the latter to receive one end of pin 31 (FIG. 7). To obtain the absolute optimum setting for a given person, the bolts 23 and 27 are mutually adjustable within slots 30 and 32. Conventional lock washer may be used with bolt 23 and nut 24 and bolt 27 and nut 28 or either of them.

From the foregoing, it will be seen that this invention is one well adapted to attain all of the ends and objects hereinabove set forth together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A device useable with a telephone handset of the type having an earpiece member and a mouthpiece member connected together by a handgrip member, said handgrip member having inner and outer sides with the inner side thereof corresponding to the speaking and listening portions of said earpiece and mouthpiece members, said device comprising:
(1) a first flange member removably mounted on the outer side of said telephone handset handgrip member intermediate the ear and mouthpiece members thereof and extending substantially normal thereto,
(2) an arcuate shoulder rest member of substantially rectangular form having an inner, concave, shoulder engagement side and an outer, convex side,
(3) a second flange member fixed to the outer convex side of said shoulder rest member intermediate the ends thereof and extending substantially normal thereto,
(4) said first and second flange members also extending, respectively, substantially at right angles to the longitudinal axis of said handset member and the longitudinal axis of said shoulder rest member and
(5) an elongate, arcuate, flat connecting member so adjustably and removably connected to each of said first and second flanges at opposite ends thereof through first and second slotted openings in opposed regions of said connecting member, as to permit length and angle adjustment of the shoulder rest member with respect to the telephone handset.

2. A device as in claim 1 wherein the connecting member is invertable with respect to engagement between the first and second flange members, thereby to provide for use of on the opposite shoulder of the user.

3. A device as in claim 1 wherein the connecting member is pivotally attached to the second flange member by a post on at least one side of a first end of said connecting member, said post removably receivable in a recess in said second flange member, there being a further removable connection of said first end to said second flange member, said removable connection including a substantially radially arcuate first slotted opening in said connecting member with respect to said post and a hole in said second flange member adapted to removably receive the shaft of a first bolt also removably receivable in said first slotted opening.

4. A device as in claim 3 wherein the connecting member is invertable with respect to engagement between the first and second flange members, thereby to provide for use thereof on the opposite shoulder of the user, said post extending vertically outwardly of said second flange on both sides thereof to enable one end of the post engagement in said recess with respect to each of said invertable positions of said connecting member.

5. A device as in claim 1 wherein the connecting member is pivotally attached to the said second flange member by a post on at least one side of a first end of said connecting member, said post removably receivable in a recess in said second flange member, there being a further removable connection of said first end to said second flange member, said removable connection including a substantially radially arcuate first slotted opening in said connecting member with respect to said post and a hole in said second flange member adapted to removably receive the shaft of a first bolt also removably receivable in said first slotted opening, the connecting member also being pivotally and slidably attached to the first flange member to adjust its position with respect thereto by means of an elongate, arcuate, second slotted opening in said connecting member, there also being an opening through said first flange member, said second slotted opening and first flange member opening receiving a removable second bolt therethrough.

6. A device as in claim 5 wherein the connecting member is invertable with respect to engagement between the first and second flange members, thereby to provide for use thereof on the opposite shoulder of the user.

7. A device as in claim 5 including an arcuate shelf on said first flange member inboard, with respect to the telephone handset, of the bolt opening, whereby the connecting member may be so configured on one edge thereof so as to substantially lie against and substantially ride against said arcuate shoulder as the connecting member is adjusted in position.

* * * * *